United States Patent
Chin et al.

(10) Patent No.: US 11,087,299 B2
(45) Date of Patent: Aug. 10, 2021

(54) POINT OF SALE REGISTER HEALTH MONITORING

(71) Applicant: Target Brands, Inc., Minneapolis, MN (US)

(72) Inventors: Steven J. Chin, Minneapolis, MN (US); Robert H. Henke, Minneapolis, MN (US); Joseph C. Eckberg, Roseville, MN (US)

(73) Assignee: Target Brands, Inc., Minneapolis, MN (US)

( * ) Notice: Subject to any disclaimer, the term of this patent is extended or adjusted under 35 U.S.C. 154(b) by 484 days.

(21) Appl. No.: 15/952,052

(22) Filed: Apr. 12, 2018

(65) Prior Publication Data

US 2018/0357625 A1    Dec. 13, 2018

Related U.S. Application Data

(60) Provisional application No. 62/517,602, filed on Jun. 9, 2017.

(51) Int. Cl.
*G06Q 20/20*    (2012.01)
*G06F 11/07*    (2006.01)

(52) U.S. Cl.
CPC ....... *G06Q 20/202* (2013.01); *G06F 11/0709* (2013.01); *G06F 11/0793* (2013.01)

(58) Field of Classification Search
CPC .......... G06Q 20/20; G06F 11/07; G06F 9/44; H04L 12/26; G06K 15/00
See application file for complete search history.

(56) References Cited

U.S. PATENT DOCUMENTS

| | | | |
|---|---|---|---|
| 7,086,584 B2 | 8/2006 | Stoutenburg et al. | |
| 7,232,063 B2* | 6/2007 | Fandel | G06Q 20/20 235/376 |
| 7,545,816 B1* | 6/2009 | Coutts | G06Q 20/1085 235/375 |
| 9,177,272 B2 | 11/2015 | Kennedy et al. | |
| 9,501,345 B1* | 11/2016 | Lietz | G06F 16/00 |
| 9,774,514 B2* | 9/2017 | Fu | G06F 11/3055 |
| 10,469,251 B2* | 11/2019 | Wu | H04L 9/0894 |
| 2002/0178400 A1* | 11/2002 | Venkataraman | G07G 1/00 714/27 |
| 2003/0083944 A1* | 5/2003 | Duvall | G06Q 20/202 705/21 |
| 2003/0216969 A1* | 11/2003 | Bauer | H01Q 7/00 705/22 |
| 2004/0059634 A1* | 3/2004 | Tami | G06Q 20/204 705/17 |
| 2006/0112379 A1* | 5/2006 | Chirakansakcharoen | G06F 9/445 717/166 |

(Continued)

*Primary Examiner* — Oluseye Iwarere
(74) *Attorney, Agent, or Firm* — Merchant & Gould P.C.

(57) ABSTRACT

Aspects of the present disclosure describe systems and methods for continuously monitoring the health of a point-of-sale (POS) device, at a central location, and executing self-healing software from the malfunctioning POS device. The self-healing software may be stored locally on the POS device itself, occupying a small footprint and therefore easily be stored in and execute on both older and newer POS devices. Embodiments further describe a central server as coordinating both identification of the particular self-healing process to execute on each POS device as well as the timing of execution associated therewith.

17 Claims, 8 Drawing Sheets

(56) References Cited

U.S. PATENT DOCUMENTS

| | | | |
|---|---|---|---|
| 2006/0182187 A1* | 8/2006 | Likovich, Jr. | H04L 1/242 375/257 |
| 2010/0050249 A1* | 2/2010 | Newman | G06Q 20/40 726/15 |
| 2014/0313882 A1* | 10/2014 | Rucker | H04W 48/18 370/219 |
| 2014/0372602 A1* | 12/2014 | Fu | H04L 43/0847 709/224 |
| 2016/0034359 A1* | 2/2016 | Cabrera | G06F 11/3409 714/19 |
| 2016/0224959 A1* | 8/2016 | Oishi | H04W 4/023 |
| 2017/0257602 A1* | 9/2017 | Axson | H04N 5/23241 |
| 2018/0253709 A1* | 9/2018 | Karro | G06F 16/1865 |
| 2018/0315035 A1* | 11/2018 | Johnson | H04L 67/1051 |
| 2018/0357625 A1* | 12/2018 | Chin | G06F 11/0793 |
| 2020/0201703 A1* | 6/2020 | Marquez | G06F 11/0769 |

* cited by examiner

POINT OF SALE REGISTER HEALTH MONITORING

CROSS-REFERENCE TO RELATED APPLICATIONS

This application claims priority to U.S. Provisional Application Ser. No. 62/517,602, filed Jun. 9, 2017 and entitled "Point of Sale Register Health Monitoring," the disclosure of which is incorporated herein by reference in its entirety.

BACKGROUND

Point of sale ("POS") devices, such as registers, can be located in most retail stores. POS devices handle purchase transactions and also store key information relating to making purchases, returns, price look-ups, discount requests, etc. POS devices may vary in form, from manned devices that are operated by a cashier to unmanned devices that may be operated by a customer (e.g., self-check-out register). Some retailers employ a combination of POS models—from newer models to older models, each requiring the same level of customer functionality. POS devices are critical to a retailer's day-to-day business transactions and any failure of a POS device may result in loss of revenue for the business. It is with respect to these and other general considerations that embodiments have been described.

SUMMARY

In summary, methods and systems for evaluating health of a point-of-sale (POS) device, and performing self-healing processes, are described. In some aspects, health information is monitored to determine if a self-healing process is required. Self-healing instructions can be transmitted from a computing system.

In a first aspect, a method for evaluating health of a point-of-sale (POS) device and providing self-healing instructions, the method comprising: receiving, at a computing system, health information associated with a POS device; determining, at the computing system, whether the health information indicates an unhealthy POS device; based on a determination that the health information indicates an unhealthy POS device: identifying, at the computing system, one or more self-healing processes to repair the unhealthy POS device; determining, at the computing system, a time to execute the identified one or more self-healing processes; and sending, from the computing system and to the POS device, self-healing instructions, wherein the self-healing instructions include the one or more self-healing processes and the time to execute the identified one or more self-healing processes.

In a second aspect, a method for executing a self-healing process on a point-of-sale (POS) device, the method comprising: scanning, by the POS device, the POS device to determine a health status for each of one or more predetermined health markers; sending, from the POS device, health status information to a computing system, the health status information comprising one or more health statuses; receiving, at the POS device, a self-healing instruction, wherein the self-healing instruction includes an identification of a self-healing process and a time to execute the identified self-healing process; and executing, at the POS device, the identified self-healing process at the time.

In a third aspect, a system for evaluating health of a point-of-sale (POS) device and providing self-healing instructions, the system comprising: a computing device including a processor, a memory communicatively coupled to the processor, and a content output device, the memory storing instructions executable by the processor to: receive, at a computing system, health information associated with a POS device; determine, at the computing system, whether the health information indicates an unhealthy POS device; based on a determination that the health information indicates an unhealthy POS device: identify, at the computing system, one or more self-healing processes to repair the unhealthy POS device; determine, at the computing system, a time to execute the identified one or more self-healing processes; and send, from the computing system and to the POS device, self-healing instructions, wherein the self-healing instructions include the one or more self-healing processes and the time to execute the identified one or more self-healing processes.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As described herein, some retailers employ a variety of different POS device models—from old to new, each of which may have a different set of performance capabilities, but all of which require the same requisite level of customer functionality. A POS device may malfunction for many reasons and any failure may result in lost revenue for a business. Embodiments illustrated herein describe systems and methods for continuously monitoring the health of a POS device, at a central location, and executing self-healing software to repair the malfunctioning POS device. The self-healing software may be stored locally on the POS device itself, occupying a small footprint. In some embodiments, the footprint is small enough so as to easily be stored in and execute on both older and newer POS devices. Embodiments further describe a central enterprise server that coordinates both identification of the particular self-healing process to execute on each POS device as well as the timing of execution associated therewith. The central enterprise server may have a more complete understanding of the status of a retail store's POS devices, and even POS devices across multiple stores. The central enterprise server may therefore have a better understanding of the needs of each retail store, and in particular, the timing for when to execute self-healing software so as to minimize disruption to the store due to performing such self-healing maintenance on POS devices. Because the central enterprise server has a system-wide understanding, embodiments described herein further provide a dashboard generated by the central enterprise server. The dashboard may provide an agent with one or more views of the status of POS devices of the enterprise (e.g., a complete status view of all POS devices, a status view of one or more retail stores, a status view of departments within a particular retail store, etc.). Accordingly, an agent can visually understand the status of all POS devices across the enterprise and even send instructions regarding when to execute self-healing processes.

Figure 1:
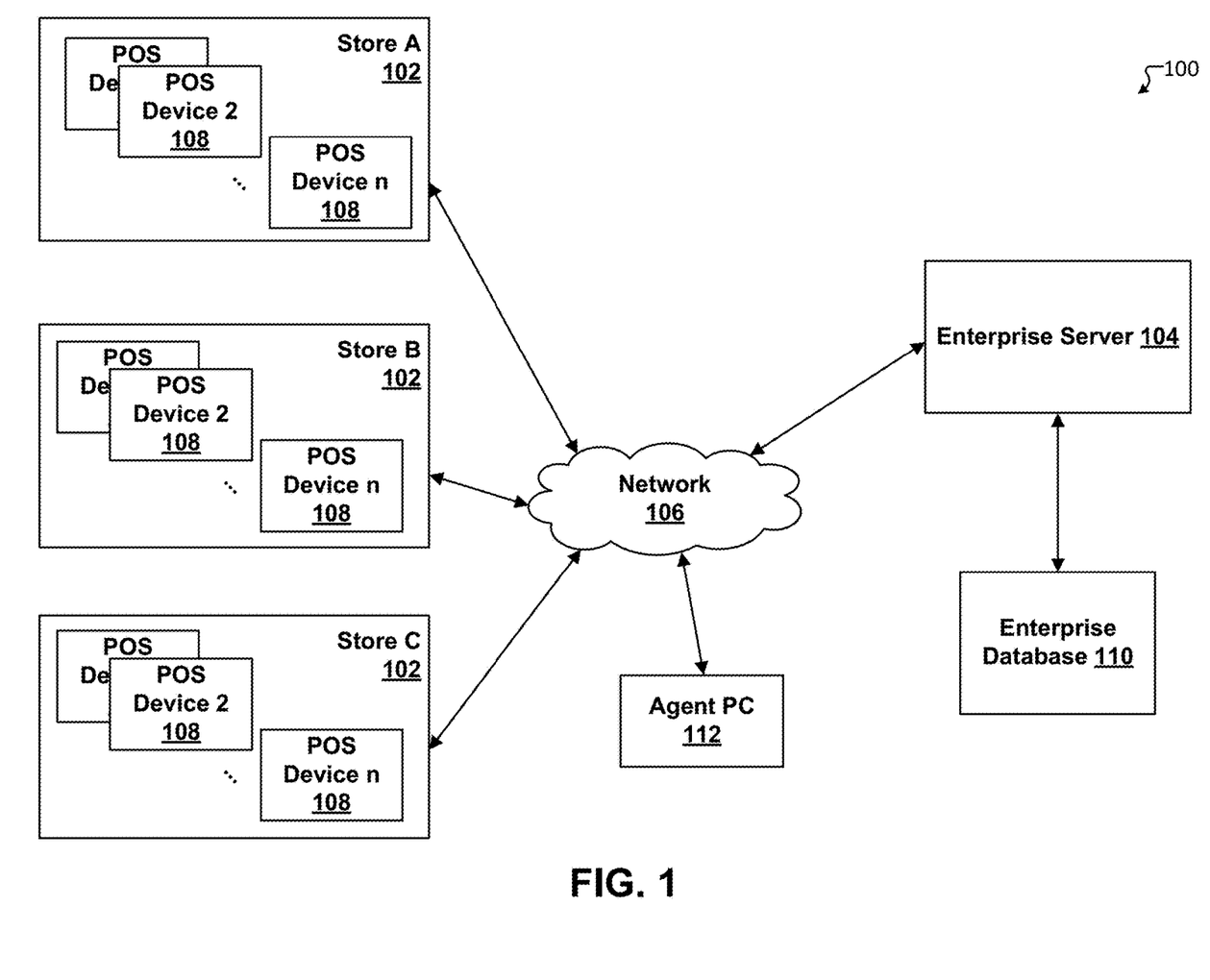
FIG. 1 illustrates an example system for monitoring POS devices and executing self-healing software thereon.

FIG. 1 illustrates an example system 100 for monitoring POS devices and executing self-healing software thereon.

The system 100 includes one or more retail stores 102 (e.g., Store A, Store B, and Store N), an enterprise server 104, and an agent PC 112 connected over a network 106. In this example, each retail store 102 may include one or more POS devices 108. As further illustrated, an enterprise database 110 may be connected to the enterprise server 104.

In this example, the system 100 includes one or more retail stores 102, wherein each of the one or more retail stores 102 has one or more POS devices 108. As will be discussed in further detail herein, each retail store 102 may have a different POS device arrangement. For example, Store A may have seven POS registers located at the front of the store, four POS registers located at the back of the store, and one POS register located in a specialty area of the store such as, for example, a coffee shop. Store B may have ten POS registers located at the front of the store, five POS registers located at the back of the store, and two POS registers located in a specialty area. Store C may have five POS registers located at the front of the store, two POS registers located at the back of the store, and two POS registers located in a specialty area. In other embodiments, other arrangements are contemplated.

In an example embodiment, and as will be described in further detail herein, each POS device 108 regularly performs a device scan, wherein the scan identifies health information of one or more health markers. Health markers may relate to, for example, hard drive usage, memory capacity, computer services running, errors in log files, attached peripherals. In some embodiments, each POS device 108 performs such a scan periodically and in other embodiments, each POS device 108 performs a scan in response to a scan request by the enterprise server 104. Each POS device 108 therefore performs a scan that determines health information of each of the one or more predetermined health markers. As will be described in further detail herein, rules may be applied to the health information to determine the health status of the corresponding health marker (e.g., healthy or unhealthy). The health information may collectively be referred to herein as "POS device health information." Each POS device 108 sends the POS device health information to the enterprise server 104 over the network 106.

In some aspects, network 106 is a computer network such as an enterprise intranet and/or the Internet. The example network 106 may include a Local Area Network (LAN), a Wide Area Network (WAN), the Internet, wireless and wired transmission mediums. POS devices 108 as described herein may communicate with components of the system 100 via a local network (e.g., an enterprise intranet). Alternatively or additionally, POS devices 108 devices may communicate with components of the system 100 via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

The enterprise server 104 is a central server receives and evaluates the POS device health information. The enterprise server 104 may, in some embodiments, store the POS device health information in the enterprise database 110. In an example, the enterprise server 104 identifies one or more POS devices that have at least one unhealthy marker and coordinates the execution of self-healing software on those identified POS devices. In particular, for each POS device 108, the enterprise server 104 evaluates the POS device health information to determine the health status of each health marker (e.g., healthy or unhealthy). The enterprise server 104 may make this determination by applying one or more rules to the health information corresponding to each health marker. Such rules may be stored in the enterprise database 110. Rules may be applied to health information of health markers differently. In some embodiments, a rule may be a predetermined threshold, and in other embodiments, a rule may be a calculated algorithm to determine the health status of the health marker.

Furthermore, the enterprise server 104 may determine whether an unhealthy marker indicates a critical failure or a non-critical failure. In an example, a critical failure may represent a failure that precludes a POS device from operating properly and therefore must be resolved before any further transactions can be completed. By contrast, a non-critical failure may represent a failure that does not prevent the POS device from operating properly, and therefore may be resolved at a later time. Each health marker may have associated therewith, a critical flag that alerts the enterprise server 104 whether an unhealthy status relating to that particular health marker is a critical failure. Based on the criticality of an unhealthy marker and other considerations (e.g., time of day, store occupancy, number of POS devices in need of self-healing at the same store, etc.), the enterprise server schedules a time to execute a self-healing process on the identified POS device. In some embodiments, the enterprise server 104 identifies a targeted self-healing process for each identified unhealthy marker. In some embodiments, the enterprise server 104 identifies multiple self-healing processes—at least one self-healing process aimed to improve the functionality of the POS device as it relates to each identified unhealthy marker.

As will be described in further detail herein, each POS device 108 may store thereon one or more self-healing processes. Accordingly, the enterprise server 104 may indicate (e.g., using a reference identifier) which of the one or more self-healing processes on the POS device to execute. The self-healing processes are designed to have a small footprint, for example, 100 KB or less. As described herein, retail stores often employ a variety of POS devices, ranging in age. Older POS devices generally have smaller storage capacities, so a set of self-healing processes that occupy a small footprint may be stored on virtually all POS devices.

Furthermore, the enterprise server 104 may schedule self-healing processes at different times. Such instruction may be based on multiple factors, such as, for example, the criticality of the unhealthy marker and how the self-healing process will disrupt the store's overall operation. For example, in the event that an unhealthy marker indicates a critical failure, the enterprise server 104 may instruct the POS device 108 to execute the self-healing process immediately. If an unhealthy marker indicates a non-critical failure, the enterprise server 104 may instruct the POS device 108 to execute the self-healing process at a later time, for example when the retail store 102 is closed so as to minimize disruption to the store's operations. In another example, the enterprise server 104 may instruct the POS device 108 to execute the self-healing process at a time in which a sale is not occurring. Alternatively or additionally, if the enterprise server 104 determines that multiple POS devices 108 in a single store indicate failure, the enterprise server 104 may stagger the execution of self-healing processes so as to ensure the store maintains a requisite number of POS devices 108 in operation such that system performance is not degraded. In one example, the enterprise server 104 may stagger self-healing actions per POS device, per store, or per enterprise to ensure too many self-healing processes are not being performed such that it degrades the overall system performance. Similarly, the enterprise server 104 may accelerate the execution of self-healing processes if enterprise-wide issues occur. Such rules may be saved in the database 110.

Furthermore, in some embodiments, the enterprise server 104 may also send a message to an agent operating a POS device 108 at a retail store 102. The message may instruct the agent to manually select and execute a particular self-healing process. Such a message may be valuable if the POS device 108 is not responding to instructions sent by the enterprise server 104, for example. In some embodiments, each POS device 108 with a display may present a self-healing user interface. Such a self-healing user interface enables the agent to select and execute a particular self-healing process.

The enterprise server 104 may further receive self-healing process status information indicating whether the instructed self-healing processes are currently being executed and when they are completed. Furthermore, each POS device 108 may send self-healing process status information after the one or more self-healing processes were executed so as to determine whether each of the self-healing processes were successful in repairing the POS device.

The enterprise server 104 may further execute a dashboard program that generates multiple views of the overall health of each POS device in the enterprise. In some embodiments, the enterprise server 104 may generate multiple views, as requested by an agent operation an agent PC 112. For example, a view may relate to the status of POS devices in the entire enterprise, in a particular store, in one or more departments, in one or more specialty stores, etc. The enterprise server 104 may further generate views based on region so as to display the status of POS devices per state, per region (e.g., Midwest, east coast, upper west coast, lower west coast, southwest, etc.), per country, per continent, etc. The dashboard program will be described in further detail herein.

The enterprise database 110 may store, for example, POS device health information (corresponding to health information of each marker) and the related status of each health marker. The status of each health marker of each POS device may be stored in the enterprise database 110 in one or more tables. In some embodiments, POS device information may be stored in a single table or in multiple tables in the enterprise database 110.

The enterprise database 110 may also store a table, for example, wherein the table stores one or more self-healing processes that each have a unique reference identifier. As will be described herein, the enterprise server 104 may include, in an instruction sent to an unhealthy POS device, a reference identifier indicating which self-healing process to execute, wherein the reference identifier corresponds to a self-healing process stored on the POS device. In some embodiments, the enterprise database 110 further stores health rules such as, for example, one or more thresholds and algorithms that may be applied to health information to determine the corresponding health of a health marker. The enterprise database 110 may further store execution rules that the enterprise server 104 may follow when determining when to instruct the POS device to execute a self-healing process. As described herein, such rules consider factors such as, for example, the criticality of the failure, the time of day, the effect on store operation, the number of POS devices in a single store, region, or enterprise that requires self-healing, etc. The enterprise database 110 may further store a record of each self-healing attempt and the corresponding results (e.g., successful self-healing attempt, unsuccessful self-healing attempt, etc.). The enterprise database 110 may store such information for a predetermined time period. The enterprise server 104 may evaluate the stored information to determine root causes of failures as well as trends to prevent future failures from arising.

Figure 2:
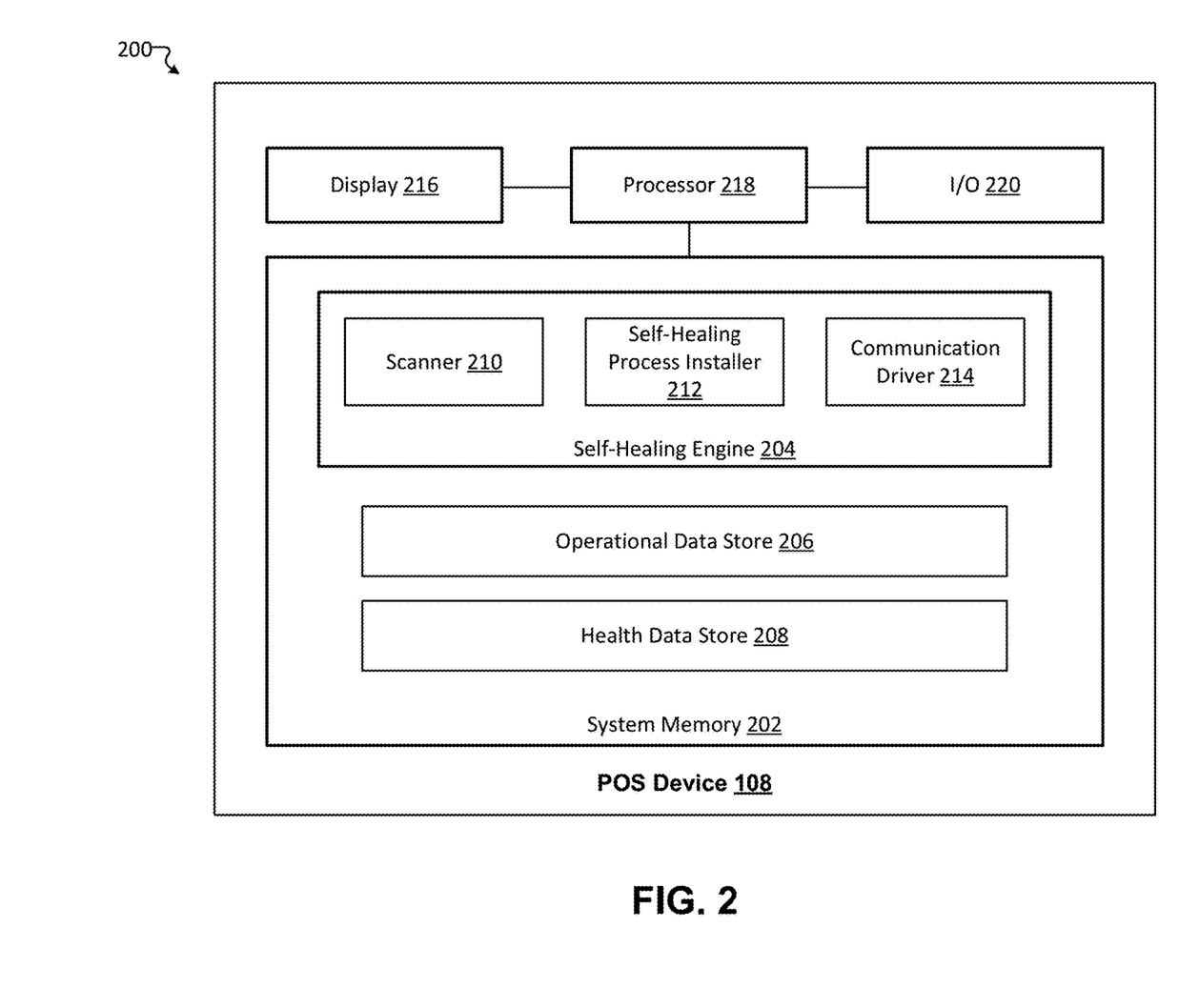
FIG. 2 illustrates a schematic block diagram of a POS device, according to an example embodiment.

FIG. 2 illustrates a schematic block diagram 200 of a POS device 108, according to an example embodiment.

In the example embodiment shown, the POS device 108 includes system memory 202 operatively connected to a processor 218. The POS device 108 also includes a display 216 and an input/output device 220, each also operatively coupled to the processor 218 and system memory 202. The display 216 can be configured to display various information associated with the sales transaction to be performed. The input/output device 220 can be any of a variety of wired or wireless communication interfaces configured to communicate, for example, transaction data with appropriate transaction server(s), as well as system health information with enterprise server 104, as discussed herein.

In this example, the system memory 202 includes a self-healing engine 204, an operational data store 206, and a health data store 208. The self-healing engine 204 includes a scanner 210, a self-healing process installer 212, and a communication driver 214. In an example, the scanner 210 performs a scan of the POS device 108. As described herein, each POS device 108 performs such a scan periodically and in other embodiments, each POS device 108 performs a scan in response to a scan request by the enterprise server 104. The scan performed determines health information of each of one or more predetermined health markers (collectively referred to herein as POS device health information). In some embodiments, each POS device 108 performs such a scan periodically such as every 10 minutes, hourly, daily, weekly, etc. Alternatively or additionally, each POS device 108 may perform a scan in response to a scan request by the enterprise server. Such POS device health information obtained from a scan may be stored in a storage device such as, for example, the health data store 208. Alternatively or additionally, the results of the scan may be sent to the enterprise server 104 and stored in the enterprise database 110. As described herein, the POS device health information may be communicated, over a network, with the enterprise server using a communication driver 214.

The self-healing process installer 212 may execute a particular self-healing process at a particular time as instructed by the enterprise server. As described herein, the enterprise server may instruct the POS device 108 to install one or more self-healing processes and the corresponding date/time of execution. The enterprise server 104 may instruct the POS device 108 to install one or more self-healing processes in response to reviewing the health information of that POS device and identifying one or more self-healing processes to correct any issues with the POS device 108. As described herein, the instructions received by the POS device 108 may comprise a reference identifier associated with a particular self-healing process and the date and time at which to execute the identified self-healing process. The self-healing process installer 212 may parse the instructions so as to identify and execute the self-healing process provided in the instructions, wherein the self-healing process may be stored in the health data store 208. Furthermore, in some embodiments, the self-healing process installer 212 may repeat installation in the event that the self-healing process did not successfully install or if the self-healing process did not successfully repair the POS device 108. The self-healing process installer 212 may further log each installation attempt and store such attempts in the health data store 208. In some embodiments, the logged attempts are also shared with the enterprise server.

The communication driver 214 may be any suitable communication device that is capable of communicating with the enterprise server over a network. In some embodiments, the communication driver 214 receives instructions from the enterprise server to install a particular self-healing process and the associated time at which to perform the installation. The communication driver 214 may further send, to the enterprise server, the results of the scan performed by the scanner 210. The communication driver 214 may also send, to the enterprise server, the installation log counting the number of times the self-healing process installer attempted to install each self-healing process.

As described herein, the health data store 208 may store all health related data of the POS device 108. For example, the health data store 208 may store one or more self-healing processes, the results of each POS device scan (e.g., the POS device health information), logged installation attempt information, instructions received from the enterprise server, etc. As described herein, the self-healing processes may be stored locally on the POS device 108 itself, occupying a small footprint. In some embodiments, the footprint is small enough so as to easily be stored in and execute on both older and newer POS devices. In some embodiments, the self-healing processes are stored as individual files of executable code on the POS device 108. In other embodiments, the self-healing processes are stored as a single file of executable code on the POS device 108 that can be executed in segments. Although a single health data store 208 is depicted, it is understood that one or more storage devices on the POS device 108 may store such health-related information.

In some embodiments, each of the self-healing processes stored in the health data store 208 may be stored in a table arrangement, and identified by a unique reference identifier. Accordingly, as described herein, instructions received by the enterprise server may include a reference to the unique reference identifier. The self-healing process installer 212 may therefore use the unique reference identifier included in the instructions to determine which self-healing process stored in the health data store 208 to execute.

As described herein, each POS device 108 performs a scan that determines health information of each of the one or more predetermined health markers. In some embodiments, the health data store 208 stores the results of each POS device scan such as, for example, POS device health information. In addition, the health data store 208 may further include the POS device health information as a result of a new scan performed following execution of the one or more self-healing processes.

In some embodiments, the health data store 208 stores the logged installation attempt information. As described herein, the self-healing process installer 212 may log each self-healing installation attempt and store such attempts in the health data store 208. In some embodiments, the log may further describe whether the one or more identified self-healing processes fully executed and the number of attempts the self-healing process installer 212 attempted to install the self-healing process.

As further illustrated, the system memory 202 includes an operational data store 206. The operational data store 206 may store the data relating to execution of a POS device 108, such as, for example, operational program code. The operational data store 206 may store additional information to operate the POS device 108 as required.

Figure 3:
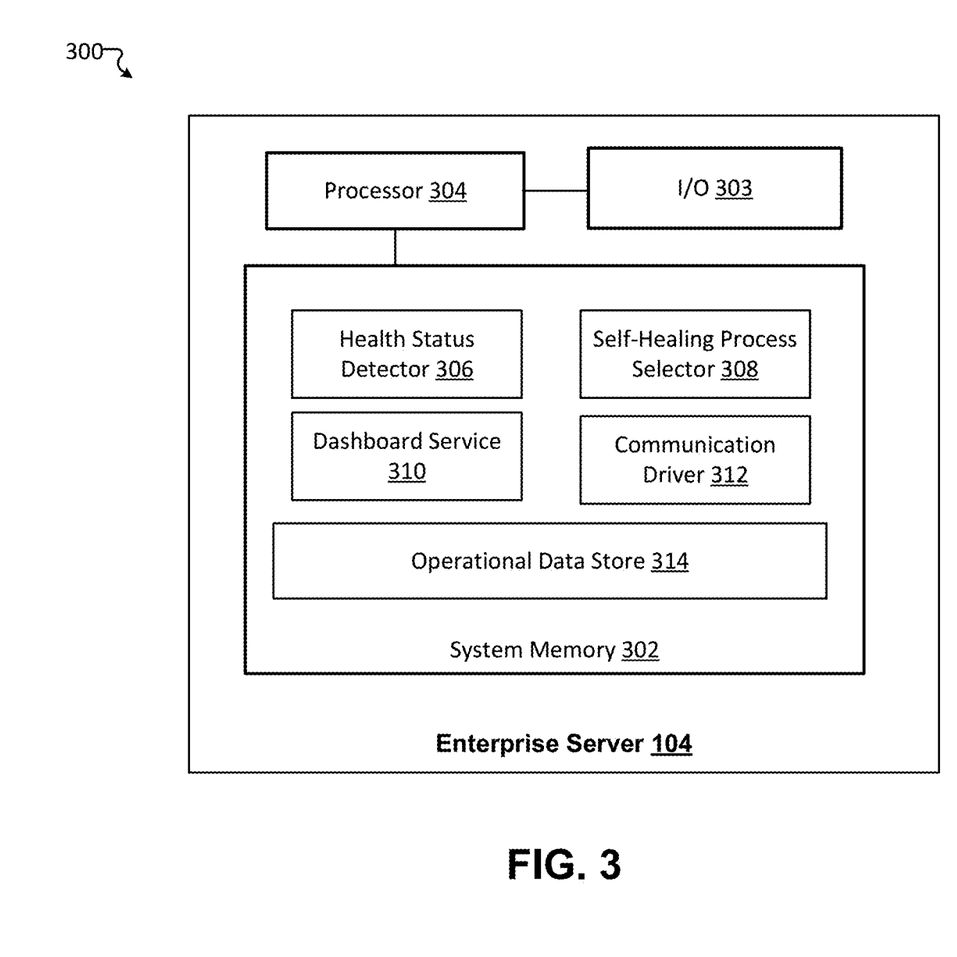
FIG. 3. illustrates a schematic block diagram of an enterprise server, according to an example embodiment.

FIG. 3. illustrates a schematic block diagram 300 of an enterprise server 104, according to an example embodiment.

In the example embodiment shown, the enterprise server 104 includes system memory 302 operatively connected to a processor 304. The processor is also operatively connected to an I/O interface 303, for communication with systems via a network (e.g., via network 106). The system memory 302 includes a health status detector 306, a self-healing process selector 308, a dashboard server 310, and a communication driver 312.

As described herein, each POS device regularly performs a scan to obtain health information of each health marker. Collectively, health information of each health marker of a POS device is referred to as POS device health information. Such POS device health information may be stored in the enterprise database (e.g., enterprise database 110) and obtained by the health status detector 306 of the enterprise server 104. The health status detector 306 evaluates the POS device health information for each POS device to determine the health of the marker. In particular, the health status detector 306 determines whether the health information of a health marker (of each POS device) indicates whether the marker is healthy or unhealthy. This determination may be performed by applying one or more rules to health information of each health marker. In some embodiments, the one or more rules are stored in the enterprise database and in other embodiments the one or more rules are stored in the enterprise server 104. The health status detector 306 may apply a different rule to the health information of each health marker. In some embodiments, a rule may be a predetermined threshold, and in other embodiments, a rule may be a calculated algorithm to determine the state of the health marker. The health status detector 302 may further determine whether an unhealthy marker indicates a critical failure or a non-critical failure. The determination of criticality may also be based on a set of rules that are stored in the enterprise database or in the enterprise server 104. The status of each health marker of each POS device determined by the health status detector 306 may be stored in the enterprise database.

The self-healing process selector 308 may select a particular self-healing process for each unhealthy marker identified for each POS device. In some embodiments, the self-healing process selector 308 identifies a targeted self-healing process for each identified unhealthy marker. In some embodiments, the self-healing process selector 308 identifies multiple self-healing processes—one self-healing process aimed to improve the functionality of the POS device for each identified unhealthy marker. In some embodiments, the self-healing process selector 308 may send a message directly to an agent operating a POS device at a retail store. The message may instruct the agent to manually select and execute a particular self-healing process. Furthermore, based on the criticality of an unhealthy marker and other considerations so as to minimize disruption to the store in which the POS device is located, the self-healing process selector 308 schedules a time to execute a self-healing process. The self-healing process selector 308 may combine the identified one or more self-healing processes and the corresponding time of execution in an instruction set that is sent to the POS device over a network using the communication driver 312 and I/O interface 303.

The dashboard service 310 is an example service that generates one or more views illustrating the status of each POS device in the system. The views may be generated in response to a request from an agent PC (e.g., agent PC 112). The one or more generated views may be, for example, a view displaying the status of all POS devices in the system, a view displaying the status of POS devices in one or more retail stores, or a view displaying the status of POS devices in a particular retail store. Alternatively or additionally, the dashboard service 310 may generate views based on a region so as to display the status of POS devices per state, per region (e.g., Midwest, east coast, upper west coast, lower west coast, southwest, etc.), per country, per continent, etc. Alternatively or additionally, the dashboard service 310 may generate views based on a particular store, in one or more departments, in one or more specialty stores, etc.

The communication driver 312 may be any suitable communication service that is capable of communicating with each POS device, enterprise database, and agent PC. In some embodiments, the communication driver 312 communicates information over the network (e.g., network 106) via I/O interface 303. The communication driver 312 periodically receives POS device health information from each POS device in the system that may be stored in the enterprise database. The communication driver 312 may further receive updated POS device health information resulting from any new scan performed following execution of the one or more self-healing processes that also may be stored in the enterprise database. The communication driver 312 may further communicate self-healing instructions to each POS device, wherein the self-healing instructions include one or more self-healing processes to execute and the corresponding time at which to execute the identified one or more self-healing processes.

Figure 4:
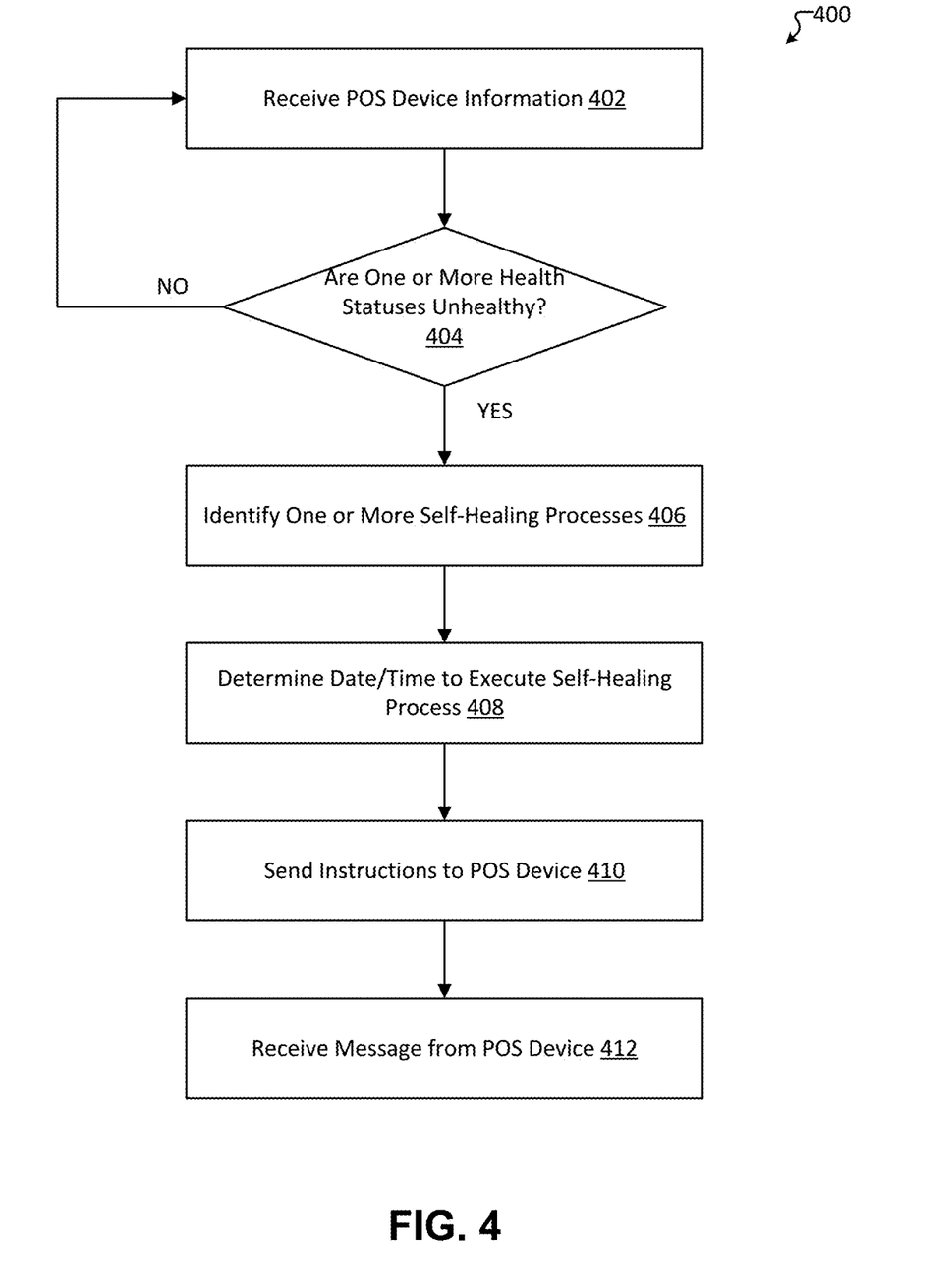
FIG. 4 illustrates an example method for providing self-healing instructions to a POS device.

FIG. 4 illustrates an example method 400 for providing self-healing instructions to a POS device.

The example method 400 may be performed by an enterprise server (e.g., enterprise server 104). In this example, method 400 may be described in terms of providing self-healing instructions to a single POS device (e.g., POS device 108), but it is understood that the method 400 may also be applicable to multiple POS devices located at the same retail store or different retail stores.

At operation 402, the enterprise server receives, from a POS device, POS device health information. As described herein, each POS device periodically performs a scan of the device, wherein the scan determines health information. As described herein, POS device health information collectively refers to the health information of each of the one or more predetermined health markers.

At operation 404, the enterprise server applies one or more rules to the health information of each health marker to determine the health status of the health marker. In other words, the enterprise server applies one or more rules to determine whether the health of each marker is healthy unhealthy. The enterprise server may apply different rules to the health status of each health marker. In some embodiments, a rule may be a predetermined threshold, and in other embodiments, a rule may be a calculated algorithm to determine the status of the health marker. Furthermore, the enterprise server may determine whether an unhealthy marker indicates a critical failure or a non-critical failure. In an example, each health marker may have associated therewith, a critical flag that alerts the enterprise server whether an unhealthy status relating to that particular health marker is a critical failure.

Thus, in operation 404, the enterprise server determines whether one or more markers are unhealthy. If the enterprise server determines that no health status is unhealthy (e.g., NO at operation 404), method 400 returns to operation 402 in which the enterprise server again receives, at a later time, POS device health information. If, however, the enterprise server determines whether one or more health statutes of a health marker is unhealthy (e.g., YES at operation 404), method 400 proceeds to operation 406.

In operation 406, the enterprise server identifies one or more self-healing processes to execute for each unhealthy marker. As described herein, in some embodiments, the enterprise server identifies a targeted self-healing process for each identified unhealthy marker. In some embodiments, the enterprise server identifies multiple self-healing processes—at least one self-healing process aimed to improve the functionality of the POS device as it relates to each identified unhealthy marker.

In some embodiments, the enterprise server determines a reference identifier associated with the particular self-healing process, wherein the reference identifier may be stored in, and looked up from, the enterprise database. As described herein, the reference identifier may correspond to a particular self-healing process stored in the POS device.

In operation 408, the enterprise server determines the date and time to execute the selected one or more self-healing processes. As described herein, the enterprise server monitors the health status of each POS device in each retail store. The enterprise server can therefore schedule the execution of self-healing processes so as to minimize the disruption to each retail store. Based on the criticality of an unhealthy marker and other considerations (e.g., time of day, store occupancy, etc.), the enterprise server schedules a time to execute a self-healing process on the identified POS device.

In the event that an unhealthy marker indicates a critical failure, the enterprise server may instruct the POS device to execute the self-healing process immediately. If an unhealthy marker indicates a non-critical failure, the enterprise server may instruct the POS device to execute the self-healing process at a later time. In an example, the enterprise server may apply execution rules that dictate how the enterprise server is to determine when to instruct the POS device to install one or more self-healing processes. As described herein, such execution rules may consider factors such as, for example, the criticality of the failure, the time of day, the effect on store operation, the number of POS devices in a single store, region, or enterprise that requires self-healing, etc. For example, an execution rule may consider various factors when determining when to instruct a POS device to execute a self-healing process. Factors may be, for example, when the retail store is closed, when customer traffic is low, or when a sale is not occurring so as to minimize disruption to the store's operations. Alternatively or additionally, the execution rules may consider multiple other POS devices. For example, the execution rules may instruct the enterprise server to determine the number of POS devices that have unhealthy health statutes in a store and stagger the execution of self-healing processes so as to ensure that system performance is not degraded and that a retail store, or multiple stores, continue to maintain a requisite number of POS devices in operation. For example, the enterprise server may stagger the execution of self-healing processes so as to not disrupt the operation of an entire store. In one example, the enterprise server may stagger self-healing actions per POS device, per store, or per enterprise to ensure too many self-healing processes are not being performed so as to degrade system performance. Similarly, the enterprise server may accelerate the execution of self-healing processes if enterprise-wide issues occur.

In operation 410, the enterprise server sends, to the POS device having one or more unhealthy statuses, self-healing instructions. As described herein, the self-healing instructions may include an identification of the one or more self-healing processes for the POS device to execute, and the date and time in which to execute the identified self-healing processes. As also described, the identification of the one or more self-healing processes may comprise a unique a reference identifier associated with the self-healing process identified in the instructions.

In operation 412, the enterprise server receives, from the POS device, a message. The message may indicate whether or not the self-healing process executed. Furthermore, the message may indicate whether or not the self-healing process was successful in repairing the POS device. In some embodiments, the enterprise server receives new status information for each of the one or more health markers that were identified as being unhealthy in operation 408. The enterprise server may log such information and store it in the enterprise database. In some embodiments, operation 412 is optional.

Figure 5:
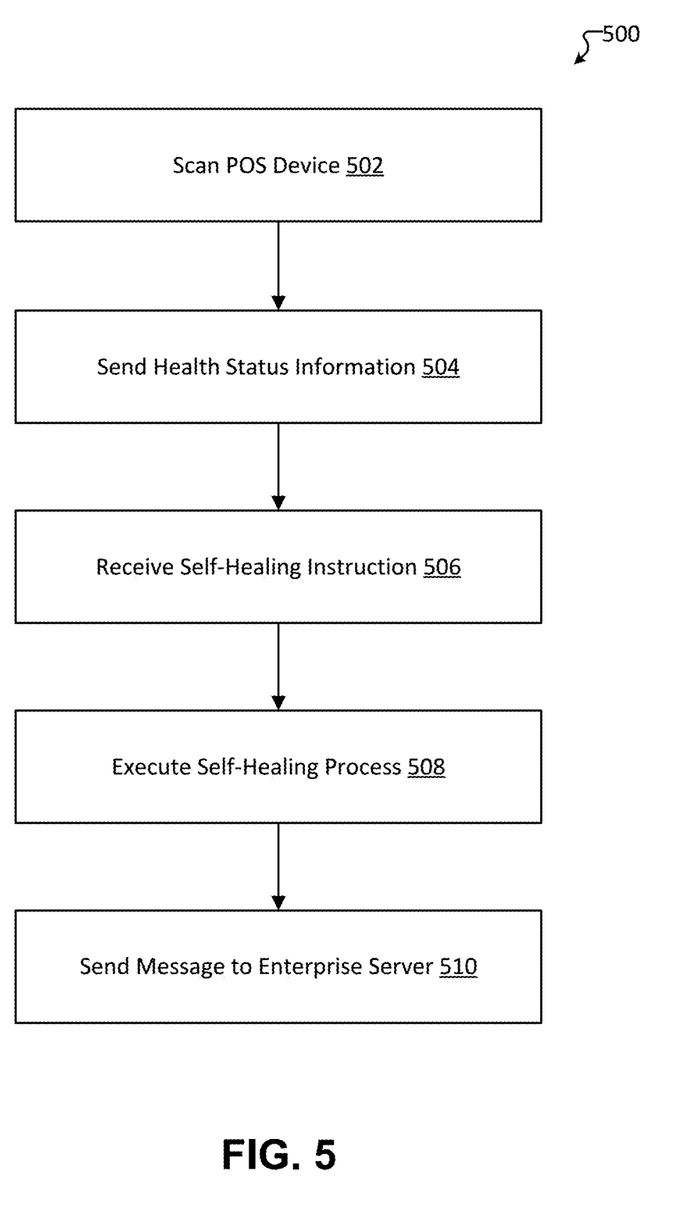
FIG. 5 illustrates an example method for executing self-healing processes on a POS device.

FIG. 5 illustrates an example method 500 for executing self-healing processes on a POS device.

The example method 500 may be performed by a POS device (e.g., POS device 108). At operation 502, the POS device performs a scan. As described herein, each POS device regularly performs a device scan, wherein the scan determines the health information of one or more health markers. The health information of each health marker is intended to convey the condition of a specific aspect of the POS device. In some embodiments, each POS device performs such a scan periodically such as every 10 minutes, hourly, daily, weekly, etc. Alternatively or additionally, each POS device may perform a scan in response to a scan request by the enterprise server. In some embodiments, the scan is performed by a scanner device (e.g., scanner 210 of FIG. 2).

In operation 504, the POS device sends, over the network, the POS device health information to the enterprise server. As described herein, the collective POS device health information comprises the health information for each of the one or more predetermined health markers. Accordingly, the POS device health information is sent to the enterprise server.

In operation 506, the POS device receives, from the enterprise server, self-healing instructions. The self-healing instructions may include an identification of the one or more self-healing processes the POS device must execute, and the date and time in which to execute the identified self-healing processes. The identification included in the instructions may be a unique reference identifier that matches the identification of a particular self-healing process stored locally on the POS device. The POS device may parse the instructions to determine each self-healing process identified in the instructions and the date and time in which to execute the identified one or more self-healing processes. Parsing the instructions may be performed by a self-healing process installer (e.g., self-healing process installer 212 of FIG. 2).

As described herein, the self-healing processes may be stored locally on the POS device itself, occupying a small footprint. In some embodiments, the footprint is small enough so as to easily be stored in and execute on both older and newer POS devices. In some embodiments, the self-healing processes are stored as individual files of executable code on the POS device. In other embodiments, the self-healing processes are stored as a single file of executable code on the POS device that can be executed in segments.

In operation 508, the POS device executes the one or more self-healing processes as instructed by the enterprise server and identified in operation 506. The one or more self-healing processes, when executed, may repair the POS device. In some embodiments, the POS device may repeat installation in the event that the self-healing process did not successfully execute or if the self-healing process did not successfully repair the POS device. The POS device may also log each installation attempt. The one or more self-healing processes may be installed using a self-healing process installer (e.g., self-healing process installer 212 of FIG. 2).

In operation 510, the POS device sends a message to the enterprise server, wherein the message indicates whether or not the self-healing process properly executed. The message may further indicate whether or not the self-healing process was successful in repairing the POS device. In some embodiments, the POS device performs a new scan of the device with respect to the health markers that were determined as being unhealthy. In some embodiments, operation 510 is optional.

Figure 6:
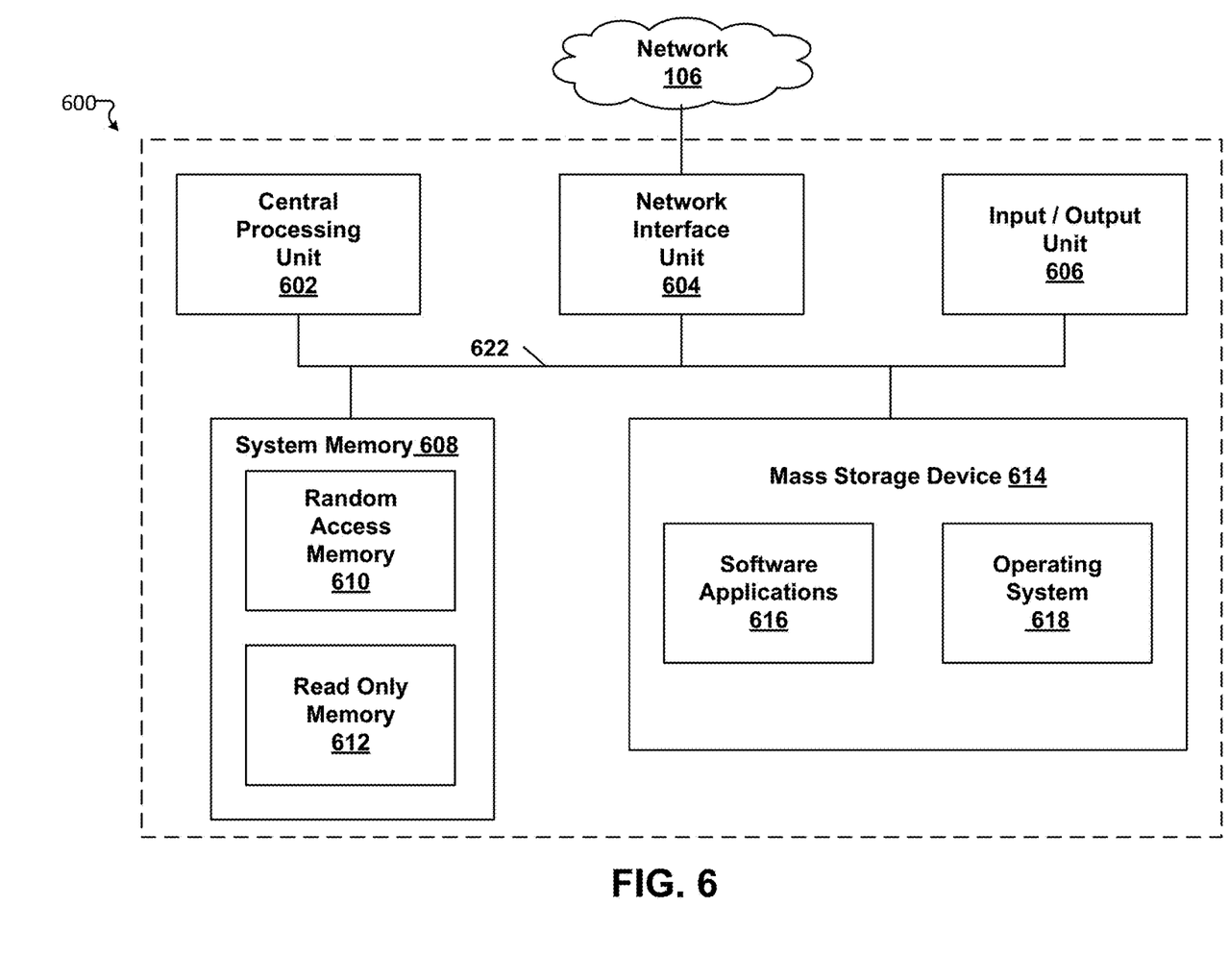
FIG. 6 illustrates an example block diagram of the computing system of FIG. 1.

FIG. 6 illustrates an example block diagram of a computing system 600 that is useable to implement aspects of the system 100 of FIG. 1. The computing system 600 can be used to implement, for example, the enterprise server 104, the POS device 108, or the agent PC 112 of FIG. 1, in example aspects.

In the embodiment shown, the computing system 600 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the computing system 600, such as during startup, is stored in the ROM 612. The computing system 600 further includes a mass storage device 614. The mass storage device 614 is able to store software instructions and data.

The mass storage device 614 is connected to the CPU 602 through a mass storage controller (not shown) connected to the system bus 622. The mass storage device 614 and its associated computer-readable data storage media provide non-volatile, non-transitory storage for the computing system 600. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 600.

According to various embodiments of the invention, the computing system 600 may operate in a networked environment using logical connections to remote network devices through a network 110, such as a wireless network, the Internet, or another type of network. The computing system 600 may connect to the network 110 through a network interface unit 604 connected to the system bus 622. It should be appreciated that the network interface unit 604 may also be utilized to connect to other types of networks and remote computing systems. The computing system 600 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the computing system 600 can store software instructions and data. The software instructions include an operating system 618 suitable for controlling the operation of the computing system 600. The mass storage device 614 and/or the RAM 610 also store software instructions, that when executed by the CPU 602, cause the computing system 114 to provide the functionality of the computing system 600 discussed in this document. For example, the mass storage device 614 and/or the RAM 610 can store software instructions that, when executed by the CPU 602, cause the computing system 600 to receive and execute self-healing processes.

Figure 7:
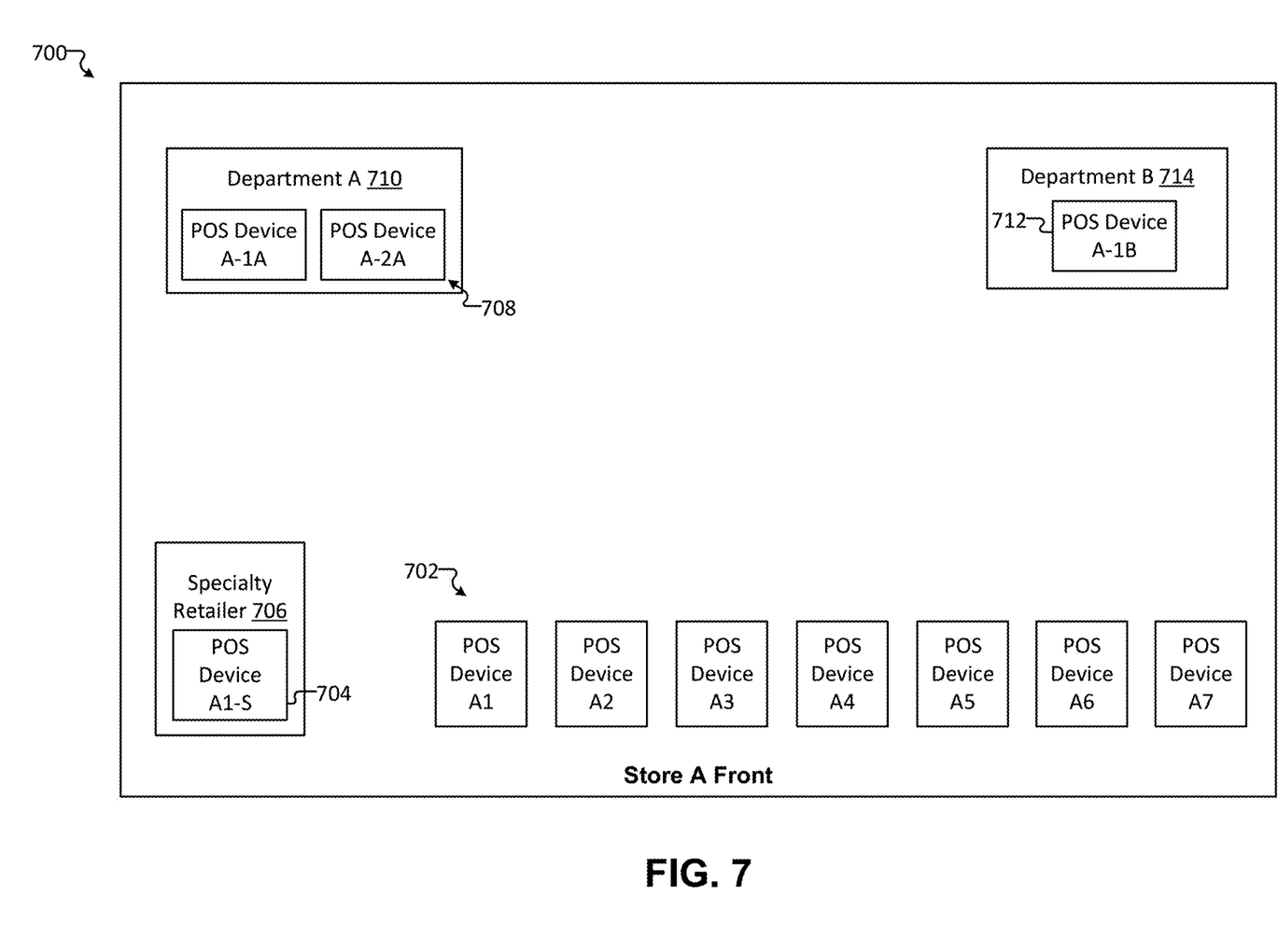
FIG. 7 illustrates a schematic diagram of an example layout of a retail store.

FIG. 7 illustrates a schematic diagram of an example layout of a retail store 700.

The schematic diagram illustrates a retail store 700 having one or more POS devices. In this example, the retail store 700 has seven POS devices 702 (POS Device A1-A7) positioned at the front of the store, a POS device 704 (POS Device A1-S) positioned in a specialty retailer 706. Furthermore, the retail store 700 has two POS devices 708 (POS Device A-1A and POS Device A-2A) positioned at Department A 710. The retail store 700 further has one POS device 712 (POS Device A-1B) positioned at Department B 714. As shown, each POS device has a unique POS identifier and might be categorized based on the location of the POS in the particular store. In some embodiments, the specialty retailer 706 may refer to, for example, a coffee shop located inside the retail store 700. Such a schematic diagram provides an example illustration of the number of POS devices that may potentially be located inside a single store. In other embodiments, POS devices may be arranged in a retail store differently. For example, another example may illustrate a POS device positioned outside the retail store (e.g., in a nursery garden part of the retail store).

As described herein, each POS device plays a critical role in conducting transactions for the store, so it is necessary to understand whether a POS device has malfunctioned and if such a malfunction would be critical. In some embodiments, a critical malfunction may refer to a transaction that cannot be completed by any other POS device. In this example, the specialty retailer 706 only has one POS device 704 located therein. Accordingly, a malfunction of that single POS device 704 may be critical to the operation of the specialty retailer 706. Such an understanding of the functioning of POS devices is therefore important to the operation of the retail store 700.

Figure 8:
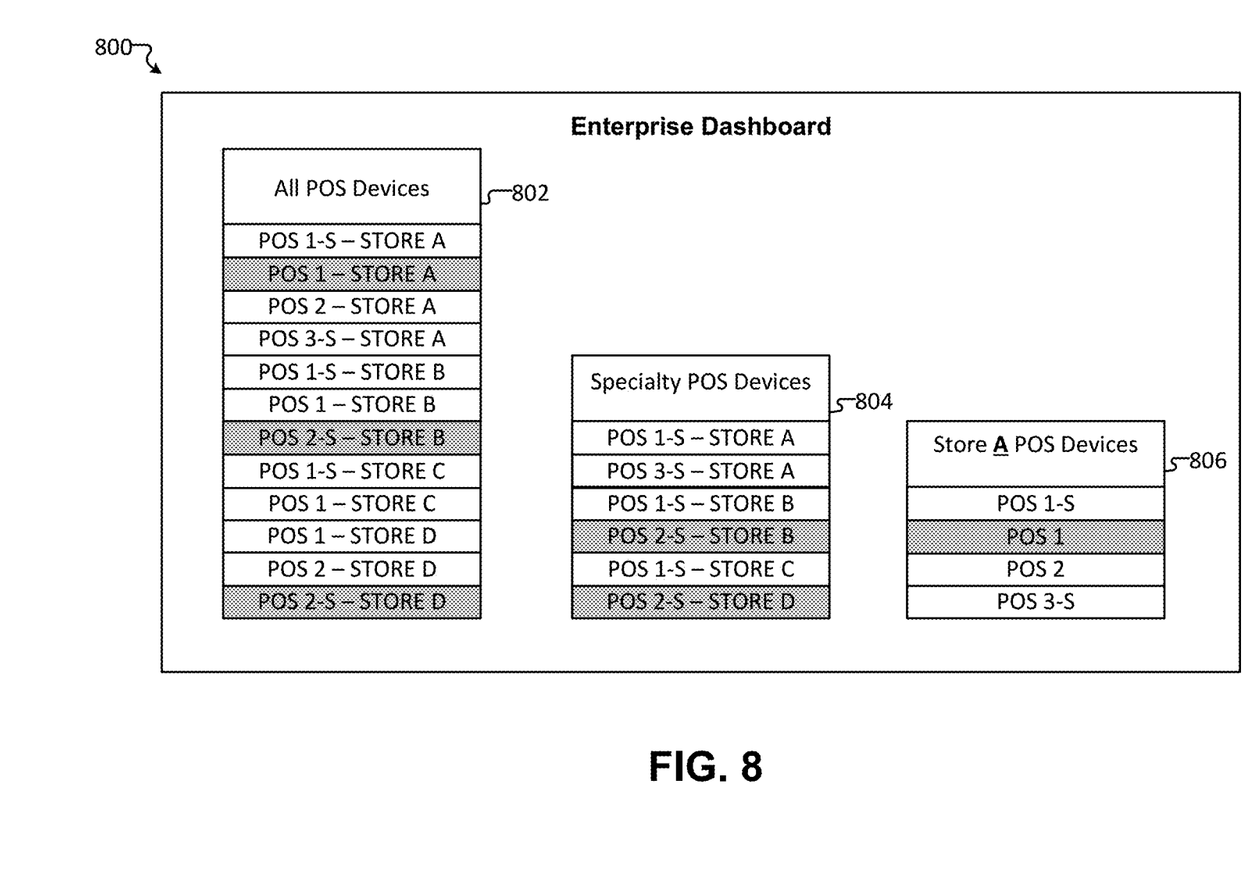
FIG. 8 illustrates an example dashboard view displaying the status of all POS devices in an enterprise.

FIG. 8 illustrates an example dashboard view 800 displaying the status of all POS devices in an enterprise.

The example dashboard view 800 may be displayed from an agent PC (e.g., agent PC 112 of FIG. 1). The agent PC may be operated by an agent associated with the enterprise. In this example, the dashboard view 800 includes a comprehensive view 802, a specialty view 804, and a store view 806. The example comprehensive view 802 displays the health status of each POS device of the entire enterprise. Accordingly, the comprehensive view 802 displays the health status of each POS device at each retail store of the enterprise. The example comprehensive view 802 identifies each POS device and further indicates its health by displaying a color. In some embodiments, a green color indicates the POS device is healthy and a red color indicates the POS device is unhealthy. In some embodiments, other colors may be used to display other statuses. In some embodiments, red may also indicate the particular POS device is experiencing a critical failure, while yellow may indicate some limited problems but for which self-healing may not yet be critical. Such a color coordination system may easily allow an agent to identify enterprise-wide problems and trends. Although a color coordination system is described, any other system that indicates the health status of a POS device may be used.

The example specialty view 804 displays the health status of each POS device located in specialty stores in all the retail stores of the enterprise. Similar to the comprehensive view 802, the specialty view 804 also lists each POS device and indicates its health. The specialty view 804 therefore allows a user to readily see a health status of such critical POS devices, for purposes of determining whether a large number of devices for which restart or other self-healing action should be avoided during business hours require attention or self-healing operations.

The example store view 806 displays the health status of each POS device located in a particular retail store of the enterprise. Similar to the comprehensive view 802 and the specialty view 804, the store view 806 also lists each POS device and indicates its health.

Although a dashboard view 800 is shown, it is understood that the disclosure is not limited thereto. An agent may request any one of multiple views, as generated by the enterprise server, as described herein.

The description and illustration of one or more aspects provided in this disclosure are not intended to limit or restrict the scope of the disclosure as claimed in any way. The aspects, examples, and details provided in this application are considered sufficient to convey possession and enable others to make and use the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for evaluating health of a point-of-sale (POS) device associated with a store and providing self-healing instructions, the method comprising:
   receiving, at a computing system, health information associated with a POS device;
   determining, at the computing system, whether the health information indicates an unhealthy POS device;
   based on a determination that the health information indicates an unhealthy POS device:
      identifying, at the computing system, one or more self-healing processes to repair the unhealthy POS device, wherein repairing the unhealthy POS device improves the ability of the POS device to conduct transactions;
      determining, at the computing system, a time to execute the identified one or more self-healing processes, wherein the determination of the time is based on one or more considerations including minimizing disruptions to the store and includes:
         analyzing health information associated with one or more POS devices associated with the POS device; and
         based on a determination that at least one of the one or more other POS devices is unhealthy, staggering the determined time to execute the identified self-healing process so as to not overlap another time to execute another self-healing process for the one or more other POS devices; and
      sending, from the computing system and to the POS device, self-healing instructions, wherein the self-healing instructions include the one or more self-healing processes and the time to execute the identified one or more self-healing processes and cause the POS device to execute the one or more self-healing processes at the determined time.

2. The method of claim 1, wherein the health information comprises a health status for each of one or more predetermined health markers.

3. The method of claim 2, wherein determining, at the computing system, whether the health information indicates an unhealthy POS device further comprises applying one or more thresholds to each health status.

4. The method of claim 2, wherein determining, at the computing system, whether the health information indicates an unhealthy POS device further comprises applying one or more rules to each health status.

5. The method of claim 1, wherein determining the time to execute the identified self-healing process further comprises:
   evaluating a level associated with the health information;
   based on a determination that the level is critical, immediately scheduling the time to execute the identified self-healing process.

6. The method of claim 1, further comprising:
   receiving, at the computing system, a message indicating a success or a failure of an execution of the identified one or more self-healing processes.

7. The method of claim 1, further comprising:
   analyzing a trend associated with one or more unhealthy POS devices.

8. A system for evaluating health of a point-of-sale (POS) device associated with a store and providing self-healing instructions, the system comprising:
   a computing device including a processor, a memory communicatively coupled to the processor, and a content output device, the memory storing instructions executable by the processor to:
      receive, at a computing system, health information associated with a POS device;
      determine, at the computing system, whether the health information indicates an unhealthy POS device;
      based on a determination that the health information indicates an unhealthy POS device:
         identify, at the computing system, one or more self-healing processes to repair the unhealthy POS device, wherein repairing the unhealthy POS device improves the ability of the POS device to conduct transactions;
         determine, at the computing system, a time to execute the identified one or more self-healing processes, wherein the determination of the time is based on one or more considerations including minimizing disruptions to the store and the determination of the time includes:
            analyze of health information associated with one or more other POS devices associated with the POS device; and
            based on a determination that at least one of the one or more other POS devices is unhealthy, stagger the determined time to execute the identified self-healing process so as to not overlap another time to execute another self-healing process for the one or more other POS devices; and
         send, from the computing system and to the POS device, self-healing instructions, wherein the self-healing instructions include the one or more self-healing processes and the time to execute the identified one or more self-healing processes; and cause the POS device to execute the one or more self-healing processes at the determined time.

9. The system of claim 8, wherein the health information comprises a health status for each of one or more predetermined health markers.

10. The system of claim 9, wherein determine, at the computing system, whether the health information indicates an unhealthy POS device further comprises apply one or more thresholds to each health status.

11. The system of claim 9, wherein determine, at the computing system, whether the health information indicates an unhealthy POS device further comprises apply one or more rules to each health status.

12. The system of claim 8, wherein determine the time to execute the identified self-healing process further comprises:
   evaluate a level associated with the health information;
   based on a determination that the level is critical, immediately schedule the time to execute the identified self-healing process.

13. The system of claim 8, further comprising:
   receive, at the computing system, a message indicating a success or a failure of an execution of the identified one or more self-healing processes.

14. The system of claim 8, further comprising:
analyze a trend associated with one or more unhealthy POS devices.

15. A method for evaluating health of a point-of-sale (POS) device associated with a store and providing self-healing instructions, the method comprising:
receiving, from a POS device, health status information comprising one or more health statuses for each of one or more predetermined health markers of the POS device;
generating a self-healing instruction based on the health status information, wherein the self-healing instruction includes an identification of a self-healing process to improve the ability of the POS device to conduct transactions and a time to execute the identified self-healing process, wherein the identification of the time is based on one or more considerations including minimizing disruptions to the store and includes:
analyzing health information associated with one or more POS devices associated with the POS device; and
based on a determination that at least one of the one or more other POS devices is unhealthy, staggering the time to execute the identified self-healing process so as to not overlap another time to execute another self-healing process for the one or more other POS devices;
transmitting, to the POS device, the self-healing instruction for execution and causing the POS device to execute the self-healing instructions.

16. The method of claim 15, further comprising:
determining whether the health status information indicates an unhealthy POS device, wherein the determining includes applying one or more thresholds to each of the one or more health statuses.

17. The method of claim 15, further comprising:
determining the time to execute the identified self-healing process, wherein the determining includes:
evaluating a level associated with the health status information; and
based on a determination that the level is critical, immediately scheduling the time to execute the identified self-healing process.

* * * * *